(12) United States Patent
Suenaga et al.

(10) Patent No.: US 11,739,715 B2
(45) Date of Patent: Aug. 29, 2023

(54) REGULATOR

(71) Applicant: NIKKI CO., LTD., Kanagawa-ken (JP)

(72) Inventors: Naoya Suenaga, Kanagawa-ken (JP); Shutaro Aizawa, Kanagawa-ken (JP)

(73) Assignee: NIKKI CO., LTD.

(*) Notice: Subject to any disclaimer, the term of this patent is extended or adjusted under 35 U.S.C. 154(b) by 0 days.

(21) Appl. No.: 17/504,471

(22) Filed: Oct. 18, 2021

(65) Prior Publication Data
US 2022/0145833 A1    May 12, 2022

(30) Foreign Application Priority Data
Oct. 19, 2020 (JP) .................. 2020-175662

(51) Int. Cl.
 F02M 21/02  (2006.01)
 F16K 1/42  (2006.01)
 F16K 17/04  (2006.01)
 G05D 16/10  (2006.01)

(52) U.S. Cl.
 CPC ......... *F02M 21/0239* (2013.01); *F16K 1/42* (2013.01); *F16K 17/04* (2013.01); *G05D 16/106* (2013.01); *Y10T 137/7808* (2015.04)

(58) Field of Classification Search
 CPC .............. Y10T 137/7808; G05D 16/103
 See application file for complete search history.

(56) References Cited

U.S. PATENT DOCUMENTS 3,435,843 A * 4/1969 Spencer .............. G05D 16/103
  137/505.25
4,467,828 A * 8/1984 Gneiding .......... G05D 16/0658
  137/484.4
4,484,695 A * 11/1984 Fallon ............... G05D 16/0658
  222/400.7

(Continued)

FOREIGN PATENT DOCUMENTS

| JP | S52-92436 U | 7/1977 |
| JP | 2019-067216 A | 4/2019 |
| WO | 2015008200 A1 | 1/2015 |

OTHER PUBLICATIONS

Extended European Search Report dated Feb. 24, 2022 for copending European Patent App. No. 21200660.5.

*Primary Examiner* — Robert K Arundale
(74) *Attorney, Agent, or Firm* — Fishman Stewart PLLC

(57) ABSTRACT

A regulator may include a main body portion, a pressure regulating chamber, a valve seat, and a piston pressure regulating valve. The piston pressure regulating valve may include a pressure regulating valve element having an end surface that is adjustable into close contact with at least a portion of the valve seat. The piston pressure regulating valve may also include a piston portion surrounding an outer periphery of the pressure regulating valve element. The piston portion may be slidable in an axial direction of a passage of the main body portion and may be biased via a pressure regulating spring disposed in an atmosphere chamber. The pressure regulating valve element may include a step protruding from a fitting portion to the piston portion at (Continued)

an upstream position disposed displaced from a pressure regulating range at an outer peripheral portion of the pressure regulating valve element.

2 Claims, 4 Drawing Sheets

(56) References Cited

U.S. PATENT DOCUMENTS

| | | | |
|---|---|---|---|
| 4,655,246 A * | 4/1987 | Phlipot | G05D 7/0146 137/505.11 |
| 10,871,789 B2 | 12/2020 | Suenaga | |
| 2002/0088495 A1* | 7/2002 | Semeia | B63C 11/2209 137/505.25 |
| 2009/0078321 A1* | 3/2009 | Arnott | G05D 16/103 137/315.04 |
| 2019/0101942 A1* | 4/2019 | Suenaga | G05D 16/103 |
| 2020/0263792 A1* | 8/2020 | Suenaga | F16K 1/36 |

* cited by examiner

REGULATOR

BACKGROUND

Technical Field

The present invention relates to a regulator used when depressurizing a high-pressure fluid to a desired pressure.

Related Art

A regulator that opens and closes a pressure regulating valve element via a piston portion by pressure fluctuation in a pressure regulating chamber and controls a flow rate of a high-pressure fluid is known for a long time as disclosed, for example, in JP S52-92436 U, and is used in, for example, a pressure regulator for supplying high-pressure fuel such as CNG stored in a fuel tank to an engine.

FIG. 5 illustrates an example of the conventional regulator in which one opening end of a passage 2 having a cylindrical shape formed through a main body portion 1 is an introduction port 21 for the high-pressure fluid, the other opening end is an extraction port 22 for the depressurized fluid, and an inlet cover 23 for airtightly introducing the high-pressure fluid and an outlet cover 24 for airtightly extracting the pressure-regulated fluid are disposed in the introduction port 21 and the extraction port 22, respectively.

Further, a valve seat 3 having a valve-seated seat 31 installed on an inner side and a seat holding member 33, which is a partition wall in which a through-hole 32 in the axial direction of the passage 2 is formed, is disposed inside the introduction port 21 in the passage 2, and a pressure regulating chamber 4 is formed on a downstream side of the valve-seated seat 31 in the passage 2.

Furthermore, a piston pressure regulating valve 7 including a pressure regulating valve element 5 having an end surface 51 that can be brought into close contact with the valve-seated seat 31 of the valve seat 3 between the passage 2 and the extraction port 22 and having a communication passage 52 having a cylindrical shape with both ends opened and a piston portion 6 having a larger diameter than the pressure regulating valve element 5 and formed to surround an outer periphery of the pressure regulating valve element 5 on the extraction port 22 side of the passage 2 is arranged to be slidable in the axial direction of the passage 2.

Moreover, the piston portion 6 is configured to be biased in the direction of the introduction port 21 of the passage 2 by a pressure regulating spring 8 having a predetermined load disposed in an atmosphere chamber 61 provided in parallel coaxially with the pressure regulating chamber 4 around the piston portion 6, the high-pressure fluid introduced through the introduction port 21 passes through the pressure regulating valve element 5 in which the communication passage 52 provided to face the valve-seated seat 31 is formed through the through-hole 32 formed in the valve-seated seat holding member 33 of the valve seat 3 and is introduced into the pressure regulating chamber 4, and the load due to the pressure of the fluid acting on the piston portion 6 joined to the pressure regulating valve element 5 and the load due to the pressure regulating spring 8 acting on the piston portion 6 on the side opposite to the pressure regulating chamber 4 are balanced, whereby the opening area of the valve-seated seat 31 and the pressure regulating valve element 5 is changed to control the fluid pressure of the pressure regulating chamber 4 so that the fluid regulated to a desired pressure is extracted through the extraction port 22.

Incidentally, in the depressurizing structure of the conventional regulator illustrated in FIG. 5, the pressure regulating spring 8 is inserted through the extraction port 22 before the outlet cover 24 is attached and then the piston pressure regulating valve 7 is inserted at the time of assembly, and the individual difference between products is large due to the dimensional tolerance of each of the valve-seated seat holding member 33, the valve-seated seat 31, the piston pressure regulating valve 7, and the main body portion 1 on which the load of the pressure regulating spring 8 acts and the load variation of the setting point of the pressure regulating spring 8.

Further, since the cylindrical end of the pressure regulating valve element 5 is pressed against the flat surface of the valve-seated seat 31 at the time of blocking the flow rate, there is a problem that the flatness of the contact surface of the valve-seated seat 31, the perpendicularity of the contact surface of the valve-seated seat 31 with the pressure regulating valve element 5 with respect to the axis of the piston pressure regulating valve 7, and the axial misalignment between the pressure regulating valve element 5 and the valve-seated seat 31 lead to a functional loss due to damage, leakage failure, or the like of the valve-seated seat 31 due to local stress generation.

Therefore, in Japanese Patent Application No. 2017-193078 (JP 2019-67216 A), the present applicant has solved the above problems, and proposed a regulator in which the load of the pressure regulating spring 8 eliminates the individual difference between products due to the dimensional tolerance of each of the valve-seated seat holding member 33, the valve-seated seat 31, the piston pressure regulating valve 7, and the main body portion 1, and the load variation of the setting point of the pressure regulating spring 8, and there is no functional loss due to damage, leakage failure, or the like of the valve-seated seat 31.

In the conventional regulator disclosed in this publication, as illustrated in FIGS. 6 and 7, the pressure regulating valve element 5 having a cylindrical shape in close contact with the valve-seated seat 31 and the piston portion 6 made of a cylindrical body that is formed to surround an outer periphery of the pressure regulating valve element 5 and causes the pressure regulating spring 8 to act, which form the piston pressure regulating valve 7, are formed separately, the pressure regulating valve element 5 and the piston portion 6 formed to surround the outer periphery of the pressure regulating valve element 5, which are formed separately to form the piston pressure regulating valve 7, are formed so as to be insertable into a diameter capable of pressure contact in a close contact state, the pressure regulating valve element 5 separated from the piston portion 6 is inserted through the introduction port 21 into the passage 2 at the time of assembly, the piston portion 6 is inserted through the extraction port 22 into the passage 2, the pressure regulating valve element 5 and the piston portion 6 can be temporarily fixed by insertion into a predetermined position in the axial direction in the passage 2, the pressure regulating valve element 5 inserted into the passage 2 through the introduction port 21 and the piston portion 6 inserted into the passage 2 through the extraction port 22 are fitted to each other at desired axial positions at the time of assembly, and the pressure regulating valve element 5 and the piston portion 6 are fixed at positions where the load of the pressure regulating spring 8 becomes a specified load by means of, for example, welding or press-fitting to constitute the piston pressure regulating valve 7.

Therefore, even when there are variations in dimensions of each of the valve-seated seat holding member 33, the valve-seated seat 31, the piston portion 6, the pressure regulating valve element 5, and the main body portion 1, which are related components, load of the pressure regulating spring 8, and the like, it is possible to set a constant load, and it is possible to minimize the individual difference between products. In particular, in the present embodiment, the pressure regulating valve element 5 and the piston portion 6 can be fixed at a designated load position while measuring the load of the pressure regulating spring 8 at the time of assembly, and are usually fixed by welding or the like. However, in a case where the pressure regulating valve element 5 and the piston portion 6 can be pressed against each other and fitted to each other, there is an advantage that strength and airtightness can be secured in a temporary fixed state where they are fitted in a press-fitted state when the pressure of the fluid to be used is not too high, and the cost can be reduced by removing welding processing.

However, in the conventional regulator, the piston pressure regulating valve 7 includes the pressure regulating valve element 5 and the piston portion 6, which are different components from each other, and they are fixed to each other and integrally formed by press-fitting and welding at predetermined adjustment positions. Therefore, in a case where the fixing portion 9 by press-fitting and welding of joint portions illustrated in FIG. 7 is unexpectedly damaged, as illustrated in FIG. 8, there is a problem that the pressure regulating spring 8 installed in the piston portion 6 biasing the pressure regulating valve element 5 in the closing direction cannot apply a force in the direction of closing the pressure regulating valve element 5, the pressure regulating valve element is constantly in an open state, the high-pressure fluid introduced through the introduction port 21 flows downstream of the regulator through the extraction port 22 without being regulated, leading to damage and airtight leakage of the downstream component.

SUMMARY

An object of the present invention is to provide a regulator in which the conventional piston portion and pressure regulating valve are formed of a pressure regulating valve element and a piston portion, which are different components from each other, and are fixed to each other and integrally formed by press-fitting and welding at predetermined adjustment positions, the pressure regulating valve element is closed to prevent an abnormal pressure increase in a pressure regulating chamber and secure safety even if the fixing portion is unexpectedly damaged, and a high-pressure fluid flows downstream through an extraction port to prevent damage and airtight leakage of the downstream component and secure safety.

A regulator which is the present invention made to solve the above problems is a regulator wherein one opening end of a passage having a cylindrical shape formed through a main body portion serves as an introduction port for a high-pressure fluid and another opening end serves as an extraction port for a depressurized fluid, a pressure regulating chamber is disposed via a valve seat having a valve-seated seat on an inner side in the introduction port of the passage and including a valve-seated seat holding member having a through-hole in an axial direction of the passage, a piston pressure regulating valve including a pressure regulating valve element having an end surface that can be brought into close contact with the valve-seated seat between the pressure regulating chamber of the passage and the extraction port and having a communication passage having a cylindrical shape with both ends opened and a piston portion formed to surround an outer periphery of the pressure regulating valve element on an extraction port side of the passage is slidable in an axial direction of the passage and biased in a direction of the introduction port of the passage by a pressure regulating spring having a predetermined load disposed in an atmosphere chamber provided coaxially in parallel with the pressure regulating chamber around the piston portion, the high-pressure fluid introduced through the introduction port is introduced into a valve-seated seat and the pressure regulating chamber provided to face the valve-seated seat via the through-hole formed in the valve-seated seat holding member of the pressure regulating valve element and passes through the pressure regulating valve element in which the communication passage is formed, a load due to a pressure of a fluid acting on the piston portion joined to the pressure regulating valve element and a load due to the pressure regulating spring acting on the piston portion on a side opposite to the pressure regulating chamber are balanced, so that an opening area of the valve-seated seat and the pressure regulating valve element is changed to control a fluid pressure in the pressure regulating chamber, the fluid regulated to a desired pressure is taken out from the extraction port, the pressure regulating valve element in close contact with the valve-seated seat and the piston portion that is formed to surround the outer periphery of the pressure regulating valve element and causes the pressure regulating spring to act, which form the piston pressure regulating valve, are separately formed, the pressure regulating valve element inserted into the passage through the introduction port and the piston portion inserted into the passage through the extraction port are fitted to each other at a desired axial position and then fixed by means of at least one of press-fitting or welding, by providing a step protruding from a fitting portion to the piston portion at an upstream position displaced from a pressure regulating range of an outer peripheral portion of the pressure regulating valve element, when fixation between the pressure regulating valve element inserted into the passage through the introduction port and the piston portion inserted into the passage through the extraction port is released, when the pressure regulating chamber reaches a certain pressure, the piston portion presses the step of the pressure regulating valve element by a biasing force of the pressure regulating spring and closes the pressure regulating valve element, so that an abnormal pressure increase in the pressure regulating chamber can be prevented and safety can be secured.

Further, in the present invention, when the step is formed by a large diameter portion integrally formed on the outer peripheral portion of the pressure regulating valve element, the step can be easily processed by, for example, cutting or drawing, and the pressure regulating valve element can be unfailingly locked to the piston portion when the fixation between the pressure regulating valve element and the piston portion is released.

According to the present invention, in the regulator in which the piston pressure regulating valve includes the pressure regulating valve element and the piston portion, which are different components from each other, and they are fixed to each other and integrally formed by press-fitting and welding at predetermined adjustment positions, in a case where the fixing portion by press-fitting and welding of joint portions of the pressure regulating valve element and the piston portion is unexpectedly damaged, the piston portion biases the pressure regulating valve element in the closing direction and the pressure regulating valve element becomes in a closed state, so that the problem that the high-pressure fluid introduced through the introduction port flows downstream of the regulator through the extraction port without being regulated, leading to damage and airtight leakage of the downstream component does not occur.

DETAILED DESCRIPTION

An embodiment of the present invention will be described below with reference to the drawings.

Figure 1:
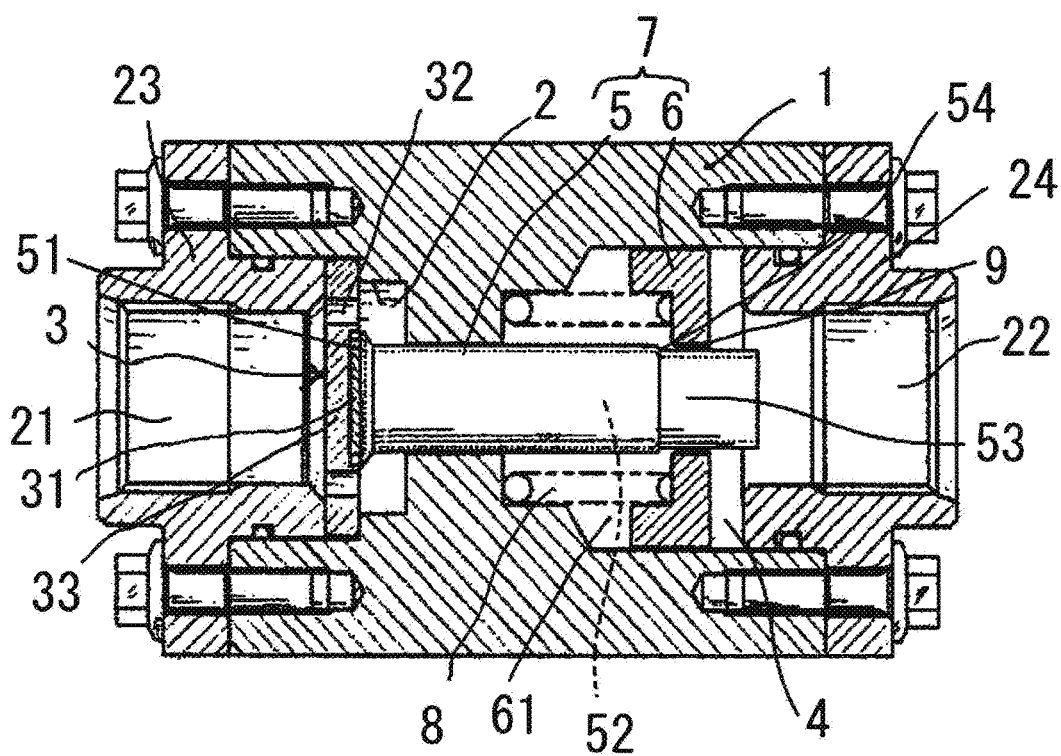
FIG. 1 is a cross-sectional view illustrating a preferred embodiment of the present invention when a valve is closed.
Figure 2:
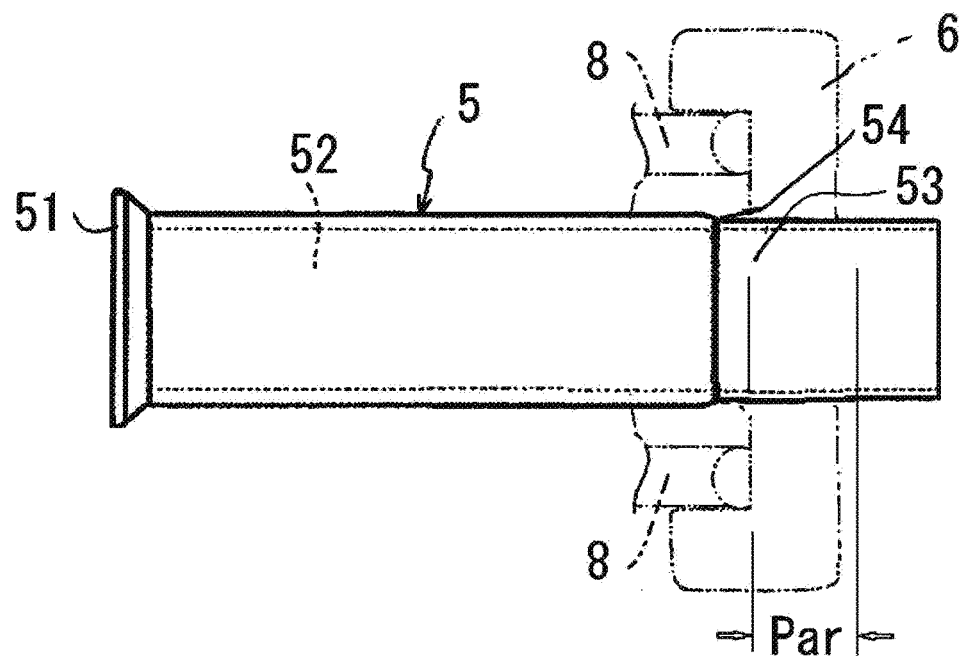
FIG. 2 is an enlarged side view illustrating a pressure regulating valve element of the embodiment illustrated in FIG. 1.
Figure 3:
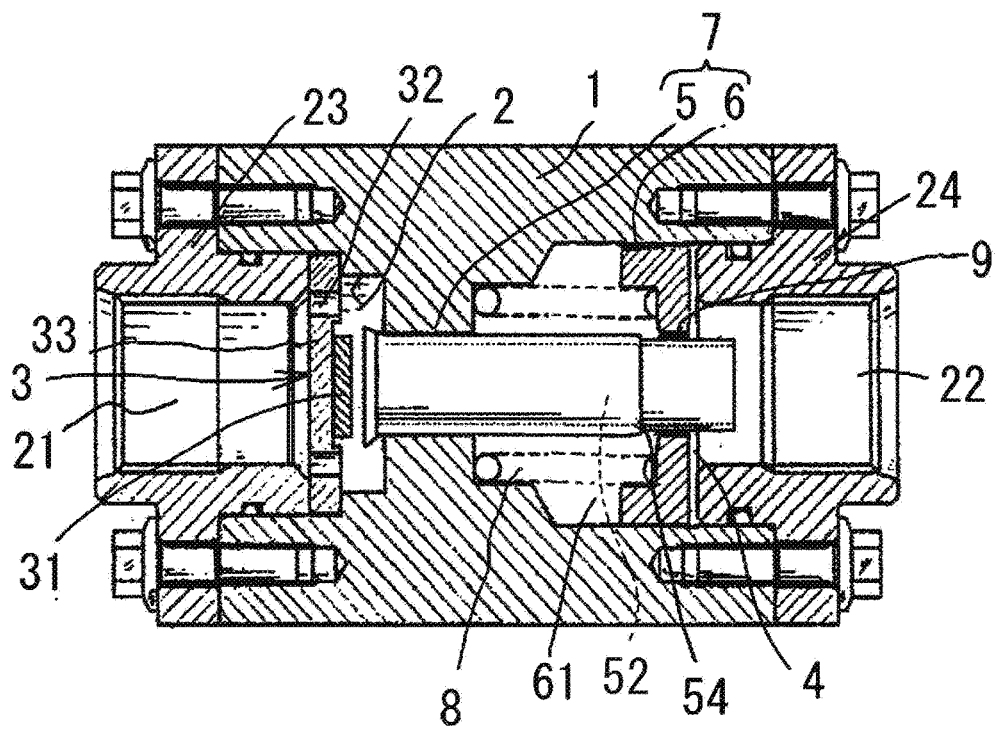
FIG. 3 is a cross-sectional view illustrating the embodiment illustrated in FIG. 1 when the valve is opened.
Figure 6:
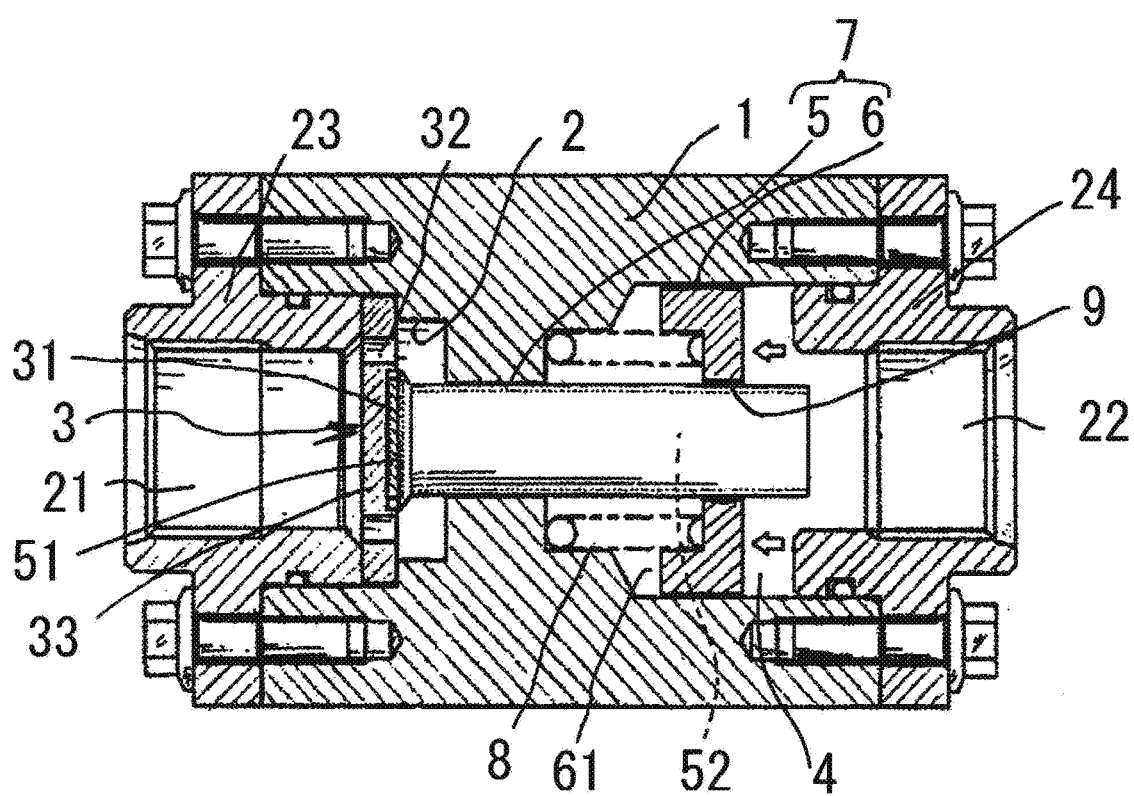
FIG. 6 is a cross-sectional view illustrating a different conventional example when a valve is closed.
Figure 7:
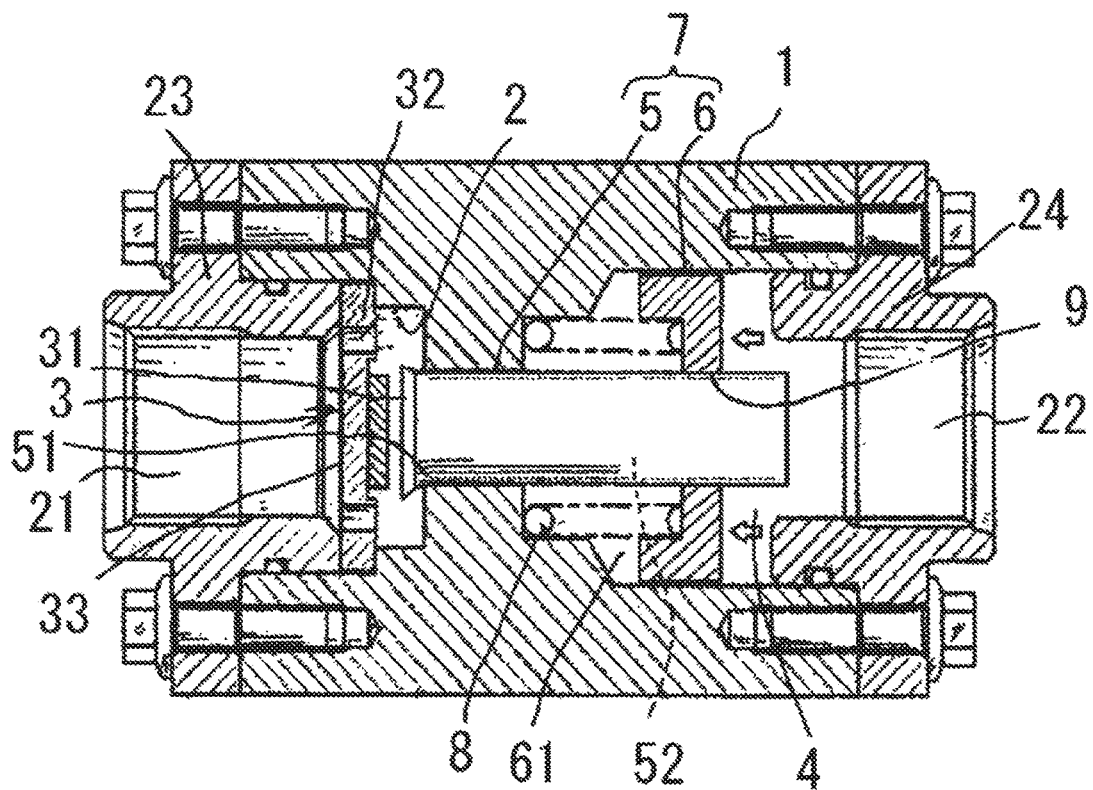
FIG. 7 is a cross-sectional view illustrating the conventional example illustrated in FIG. 6 when the valve is opened.
Figure 8:
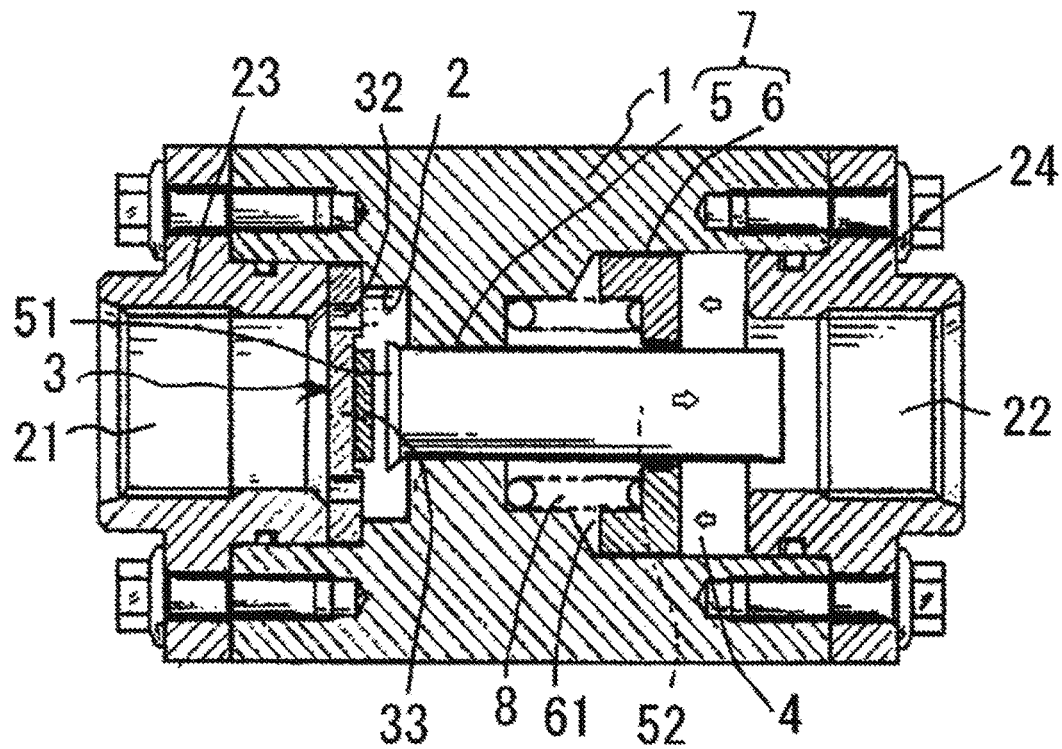
FIG. 8 is a cross-sectional view illustrating a case where a fixing portion by press-fitting and welding of joint portions between a pressure regulating valve element and a piston portion of the conventional example illustrated in FIG. 6 is damaged.

FIGS. 1 to 3 illustrate a preferred embodiment of the present invention, and the overall configuration is substantially the same as that of the conventional example illustrated in FIGS. 6 to 8, and detailed description thereof will be omitted. Further, the same components as those in the conventional example will be denoted by the same reference numerals.

Then, the present embodiment is different from the conventional example illustrated in FIGS. 6 to 8 in that a step 54 protruding from a fitting portion 53 to the piston portion 6 is provided at an upstream position slightly displaced from a pressure regulating range (Par illustrated in FIG. 2) of an outer peripheral portion of the pressure regulating valve element 5.

According to the present embodiment having such a configuration, since the piston portion 6 and the pressure regulating valve element 5 are configured as different components from each other, even when there are variations in dimensions of each of the valve-seated seat holding member 33, the valve-seated seat 31, the piston portion 6, the pressure regulating valve element 5, and the main body portion 1, load of the pressure regulating spring 8, and the like, it is possible to set a constant load, and it is possible to minimize the individual difference between products. In particular, in the present embodiment, the pressure regulating valve element 5 and the piston portion 6 can be fixed at a designated load position while measuring the load of the pressure regulating spring 8 at the time of assembly, and are usually fixed by welding or the like. However, in a case where the pressure regulating valve element 5 and the piston portion 6 can be pressed against each other and fitted to each other, there is an advantage that strength and airtightness can be secured in a temporary fixed state where they are fitted in a press-fitted state when the pressure of the fluid to be used is not too high, and the cost can be reduced by removing welding processing.

Figure 4:
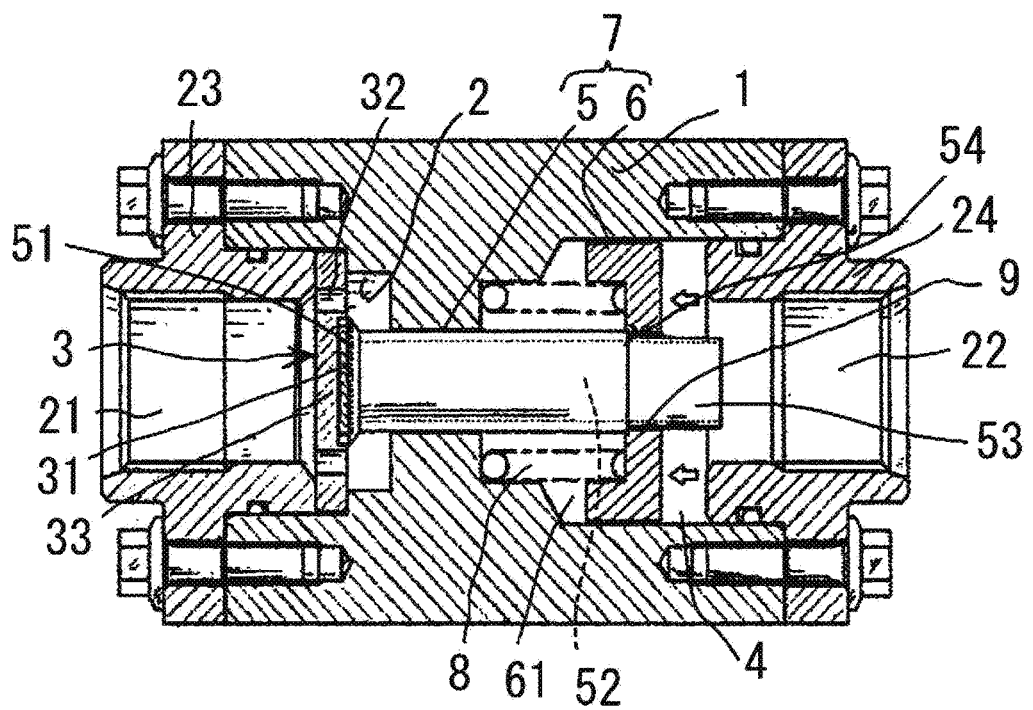
FIG. 4 is a cross-sectional view illustrating a case where a fixing portion by press-fitting and welding of joint portions between a pressure regulating valve element and a piston portion of the embodiment illustrated in FIG. 1 is damaged.
Figure 5:
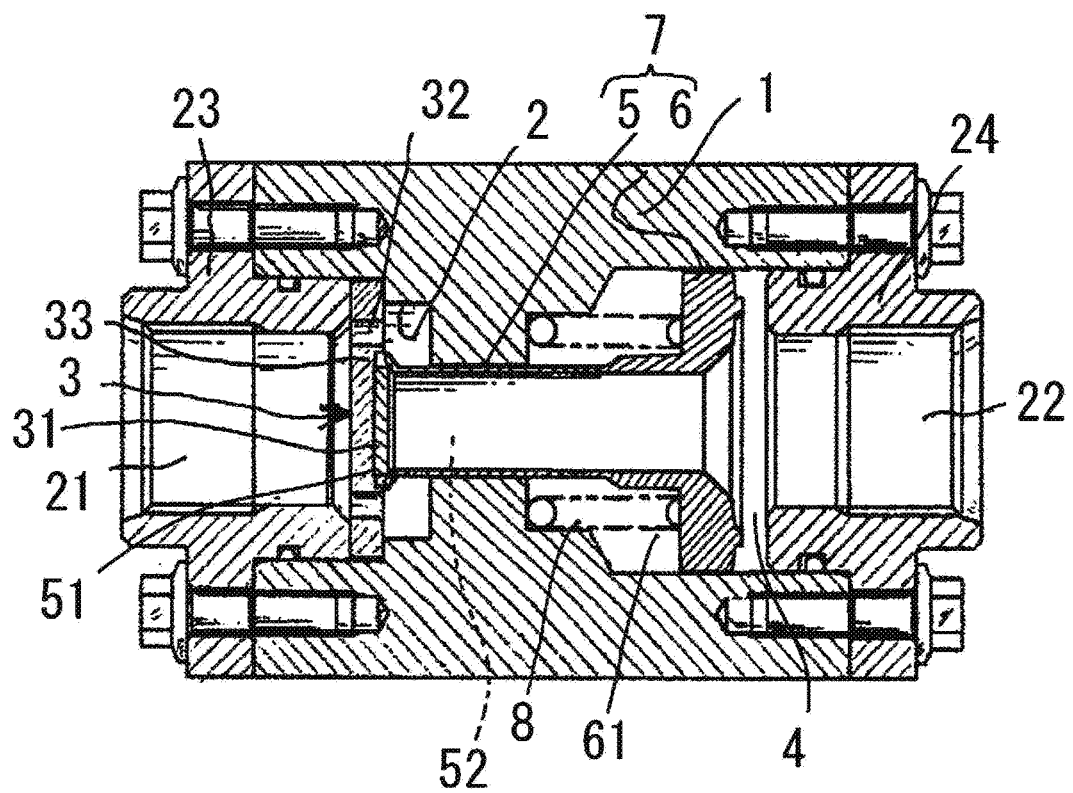
FIG. 5 is a cross-sectional view illustrating a conventional example when a valve is closed.

Further, when the fixing portion 9 obtained by the pressure regulating valve element 5 and the piston portion 6 fixed and integrally formed by press-fitting and welding at predetermined adjustment positions is unexpectedly damaged and the piston portion 6 and the pressure regulating valve element 5 are separated, the pressure regulating valve element 5 becomes free, the high-pressure fluid introduced through the introduction port 21 is introduced into the pressure regulating chamber 4 provided to face the valve-seated seat 31 via the through-hole 32 formed in the valve-seated seat holding member 33 of the valve seat 3 as illustrated in FIG. 4, and when the high-pressure fluid introduced into the pressure regulating chamber 4 reaches a certain pressure, the piston portion 6 presses the step 54 of the pressure regulating valve element 5 against the biasing force of the pressure regulating spring 8, the pressure regulating valve element 5 is pressed downstream, and the end surface 51 is seated on the valve-seated seat 31 to close the valve.

Thus, it is possible to prevent a further abnormal pressure increase in the pressure regulating chamber 4 and prevent the high-pressure fluid from flowing downstream of the regulator without being regulated to secure safety by eliminating damage, airtight leakage, and the like of the downstream component.

Note that, in the present embodiment, the step 54 is formed of a large-diameter portion integrally formed on the outer peripheral portion of the pressure regulating valve element 5, the step 54 can be easily processed by, for example, cutting, drawing, rolling, or the like, and the pressure regulating valve element 5 can be unfailingly locked to the piston portion 6 in a case where the fixation between the pressure regulating valve element 5 and the piston portion 6 is released. However, it goes without saying that the step 54 is not limited to this, and it is sufficient if the step 54 protrudes on the outer peripheral portion of the pressure regulating valve element 5 like, for example, a protrusion or a ring (not illustrated), and the step 54 may not be integral with, but may be formed separately from the pressure regulating valve element 5.

What is claimed is:

1. A regulator, comprising:
    a main body portion including a passage formed through the main body portion, one opening end of the passage serving as an introduction port for introducing a fluid and another opening end of the passage serving as an extraction port for extracting a fluid;
    a valve seat including a valve-seated seat on an inner side in the introduction port of the passage and a valve-seated seat holding member having a through-hole in an axial direction of the passage;
    a pressure regulating chamber formed on a downstream side of the valve-seated seat in the passage;
    a piston pressure regulating valve including a pressure regulating valve element having an end surface that is contactable with the valve-seated seat, the piston pressure regulating valve disposed between the pressure regulating chamber of the passage and the introduction port, the piston pressure regulating valve including a communication passage having a cylindrical shape with both ends opened;
    the piston pressure regulating valve further including a piston portion formed to surround an outer periphery of a fitting portion of the pressure regulating valve element on an extraction port side of the passage, the piston portion slidable in an axial direction of the passage and biased in a direction of the extraction port of the passage via a pressure regulating spring having a predetermined load disposed in an atmosphere chamber provided coaxially in parallel with the pressure regulating chamber around the piston portion;

wherein, during operation, the fluid introduced through the introduction port is introduced into the pressure regulating chamber via the through-hole formed in the valve-seated seat holding member and passes through the pressure regulating valve element in which the communication passage is formed, a load due to a pressure of a fluid acting on the piston portion joined to the pressure regulating valve element and a load due to the pressure regulating spring acting on the piston portion on a side opposite to the pressure regulating chamber are balanced such that an opening area of the valve-seated seat and the pressure regulating valve element is changed to control a fluid pressure in the pressure regulating chamber, and a fluid regulated to a desired pressure is taken out from the extraction port;

wherein the pressure regulating valve element and the piston portion are separately formed;

wherein the pressure regulating valve element is insertable into the passage through the introduction port and the piston portion is insertable into the passage through the extraction port, and the pressure regulating valve element and the piston portion are fitted to each other at an axial position and then fixed via at least one of press-fitting and welding at a fixing portion;

wherein the pressure regulating valve element includes a step protruding from the fitting portion at an upstream position disposed spaced apart from the fixing portion at an outer peripheral portion of the pressure regulating valve element; and wherein, in a case where fixation between the pressure regulating valve element and the piston portion is released, when the pressure regulating chamber reaches a predetermined pressure, the piston portion presses the step of the pressure regulating valve element against a biasing force of the pressure regulating spring and closes the pressure regulating valve element.

2. The regulator according to claim 1, wherein the step has a larger diameter than the fitting portion.

* * * * *